United States Patent
Song et al.

(10) Patent No.: US 12,113,170 B2
(45) Date of Patent: Oct. 8, 2024

(54) ELECTROLYTE COMPOSITION AND SECONDARY BATTERY USING SAME

(71) Applicant: DONGWOO FINE-CHEM CO., LTD., Iksan-si (KR)

(72) Inventors: Kwanwook Song, Pyeongtaek-si (KR); Joonghan Kum, Dangjin-si (KR); Seongchul Lee, Pyeongtaek-si (KR); Han Young Choi, Pyeongtaek-si (KR)

(73) Assignee: DONGWOO FINE-CHEM CO., LTD., Iksan-si (KR)

(*) Notice: Subject to any disclaimer, the term of this patent is extended or adjusted under 35 U.S.C. 154(b) by 651 days.

(21) Appl. No.: 17/296,461

(22) PCT Filed: Nov. 19, 2019

(86) PCT No.: PCT/KR2019/015857
§ 371 (c)(1),
(2) Date: May 24, 2021

(87) PCT Pub. No.: WO2020/111633
PCT Pub. Date: Jun. 4, 2020

(65) Prior Publication Data
US 2021/0399343 A1  Dec. 23, 2021

(30) Foreign Application Priority Data

Nov. 26, 2018 (KR) .......................... 10-2018-147739
Jul. 25, 2019 (KR) .......................... 10-2019-0090420

(51) Int. Cl.
*H01M 10/05* (2010.01)
*C07F 7/18* (2006.01)
*H01M 10/0525* (2010.01)
*H01M 10/0567* (2010.01)

(52) U.S. Cl.
CPC ....... *H01M 10/0567* (2013.01); *C07F 7/1804* (2013.01); *H01M 10/0525* (2013.01); *H01M 2300/0025* (2013.01)

(58) Field of Classification Search
None
See application file for complete search history.

(56) References Cited

U.S. PATENT DOCUMENTS

2010/0167121 A1* 7/2010 Arai et al. ............ H01M 4/587
429/188

FOREIGN PATENT DOCUMENTS

| CN | 103493280 A | 1/2014 | |
|---|---|---|---|
| CN | 108321434 A | 7/2018 | |
| EP | 1 898 485 A1 | 3/2008 | |
| EP | 2 704 246 A1 | 3/2014 | |
| JP | 2006-004813 A | 1/2006 | |
| JP | 2006004813 * | 1/2006 | ............ H01M 10/05 |
| JP | 2010-157437 A | 7/2010 | |
| JP | 5089828 B2 | 12/2012 | |
| JP | 2013-089390 A | 5/2013 | |
| JP | 2013089390 * | 5/2013 | .......... H01M 10/052 |
| JP | 5542827 B2 | 7/2014 | |
| JP | 2015-191738 A | 11/2015 | |
| KR | 10-2007-0031584 A | 3/2007 | |
| KR | 10-2010-0076911 A | 7/2010 | |
| KR | 10-0969130 B1 | 7/2010 | |
| KR | 10-0977973 B1 | 8/2010 | |
| WO | 2007/064076 A1 | 6/2007 | |
| WO | 2011/034065 A1 | 3/2011 | |
| WO | 2013/184881 A1 | 12/2013 | |
| WO | 2019/156434 A1 | 8/2019 | |

OTHER PUBLICATIONS

International Searching Authority, International Search Report for PCT/KR2019/01587 dated Feb. 27, 2020 [PCT/ISA/210].
International Searching Authority, Written Opinion for PCT/KR2019/01587 dated Feb. 27, 2020 [PCT/ISA/237].

* cited by examiner

Primary Examiner — Maria Laios
Assistant Examiner — Angela J Martin
(74) Attorney, Agent, or Firm — Sughrue Mion, PLLC

(57) ABSTRACT

An electrolyte composition contains a propane sultone compound substituted with a specific substituent, a cyclic fluorocarbonate-based compound and a nonaqueous solvent. A secondary battery containing the electrolyte composition is disclosed. The electrolyte composition has excellent SEI film-forming ability and HF-removing ability by containing the cyclic fluorocarbonate-based compound together with the propane sultone compound substituted with a specific substituent, so that the lifespan characteristic and stability at high temperature can be improved.

13 Claims, No Drawings

ELECTROLYTE COMPOSITION AND SECONDARY BATTERY USING SAME

CROSS REFERENCE TO RELATED APPLICATIONS

This is a National Stage of International Application No. PCT/KR2019/015857 filed Nov. 19, 2019, claiming priority based on Korean Patent Application No. 10-2018-0147739 filed Nov. 26, 2018 and Korean Patent Application No. 10-2019-0090420 filed Jul. 25, 2019, the contents of all of which are incorporated herein by reference in their entirety.

TECHNICAL FIELD

The present invention relates to an electrolyte composition and a secondary battery using the same, and more particularly, relates to an electrolyte composition having excellent SEI film-forming ability and HF-removing ability, thereby having improved lifespan characteristic and stability at high temperature, and a secondary battery using the same.

BACKGROUND ART

Recently, as the supply of electric vehicles and portable electronic devices increases, the demand for lithium secondary batteries with high energy density and operating potential and having low self-discharge rate has been rapidly increasing.

During initial charging of a lithium secondary battery, lithium ions from a positive electrode active material such as lithium metal oxide migrate to a negative electrode active material, and are interposed between the layers of the negative electrode active material. At this time, since lithium ions have high reactivity, the electrolyte composition and the material constituting the negative electrode active material react on the surface of the negative electrode active material to form a SEI (Solid Electrolyte Interface) film which is a kind of protective film on the surface of the negative electrode active material.

The SEI film prevents the negative electrode structure from the destruction caused by the intercalation of organic solvent molecules having a large molecular weight which migrate together with lithium ions in the electrolyte composition between the layers of the negative electrode active material. Therefore, contact between the electrolyte composition and the negative electrode active material are prevented, so that the decomposition of the electrolyte composition does not occur, and the amount of lithium ions in the electrolyte composition is reversibly maintained, thereby maintaining stable charging and discharging.

Accordingly, interest in additives for improving lifespan characteristic by forming a stable SEI film on the surface of the negative electrode has been increasing. In particular, cyclic fluorocarbonate-based compounds such as fluoroethylene carbonate (FEC) have excellent ability to form an SEI film on the surface of the negative electrode and thus are used as an agent for forming a film on the negative electrode in the lithium ion battery, while they are also widely used as a co-solvent [Korean Registered Patent No. 10-0977973].

However, FEC may be decomposed in an electrolyte to produce hydrofluoric acid (HF). The HF may be decomposed in the process of charging and discharging to release hydrogen gas. Particularly, such phenomenon may be intensified at high temperature, and thus a swelling phenomenon may be caused, or, in a severe situation an explosion may be caused. Further, the HF is acidic, and may cause corrosion or the like to the electrode.

Accordingly, there is a need for development of an electrolyte composition having excellent HF-removing ability with SEI film-forming ability thereby having improved lifespan characteristics and stability at high temperature.

DISCLOSURE

Technical Problem

It is an object of the present invention to provide an electrolyte composition having excellent SEI film-forming ability and HF-removing ability, thereby having improved lifespan characteristic and stability at high temperature.

It is another object of the present invention to provide a secondary battery using the electrolyte composition.

Technical Solution

In one aspect of the present invention, the present invention provides an electrolyte composition comprising a compound of formula (1), a cyclic fluorocarbonate-based compound and a nonaqueous solvent.

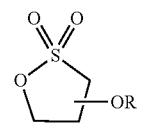

(1)

wherein,
R is hydrogen atom or $Si[(CH_2)_xCH_3]_y[(CH_2)_zCF_3]_{3-y}$, and
x, y and z are each independently an integer of 0 to 3.

In one embodiment of the present invention, R may be $Si[(CH_2)_xCH_3]_y[(CH_2)_zCF_3]_{3-y}$, and x, y and z may be each independently an integer of 0 to 3.

In one embodiment of the present invention, the compound of formula (1) may be contained in an amount of 0.05 to 5% by weight, based on 100% by weight of the total electrolyte composition.

In one embodiment of the present invention, the cyclic fluorocarbonate-based compound may comprise fluoroethylene carbonate.

In one embodiment of the present invention, the cyclic fluorocarbonate-based compound may be contained in an amount of 0.5 to 30% by weight, based on 100% by weight of the total electrolyte composition.

In one embodiment of the present invention, a mixing ratio of the compound of formula (1) and the cyclic fluorocarbonate-based compound may be 1:1 to 1:20.

In one embodiment of the present invention, the electrolyte composition may further comprise a lithium salt.

In another aspect of the present invention, the present invention provides a secondary battery using the electrolyte composition.

In one embodiment of the present invention, the secondary battery may be a lithium secondary battery.

Advantageous Effects

The electrolyte composition according to the present invention comprises a cyclic fluorocarbonate-based compound together with a propane sultone compound substituted with a specific substituent, thereby having excellent SEI film-forming ability, and thus when it is applied to a battery, lifespan characteristic at room temperature can be excellent, and power can be enhanced. Also, the electrolyte composition according to the present invention has excellent HF-removing ability, and thus lifespan characteristic is excellent even at high temperature, and stability at high temperature can be improved, thereby enhancing durability.

BEST MODE

Hereinafter, the present invention will be described in more detail.

One embodiment of the present invention relates to an electrolyte composition comprising a compound of formula (1), a cyclic fluorocarbonate-based compound and a non-aqueous solvent.

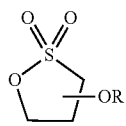
(1)

wherein,
R is hydrogen atom or $Si[(CH_2)_xCH_3]_y[(CH_2)_zCF_3]_{3-y}$, and
x, y and z are each independently an integer of 0 to 3.

In one embodiment of the present invention, R may be $Si[(CH_2)_xCH_3]_y[(CH_2)_zCF_3]_{3-y}$, and x, y and z may be each independently an integer of 0 to 3.

In one embodiment of the present invention, the compound of formula (1) may be a compound represented by any one of formulae (2) to (9).

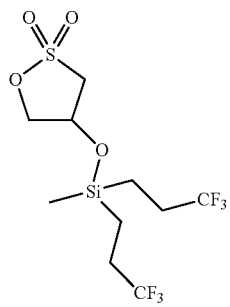
(2)

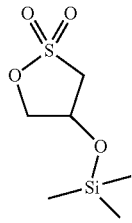
(3)

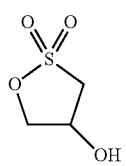
(4)

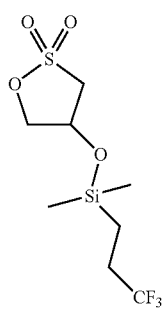

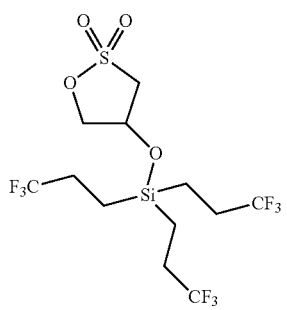
(5)

(6)

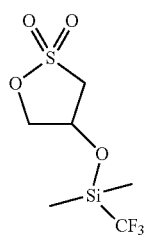
(7)

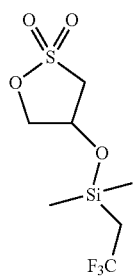
(8)

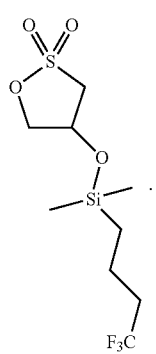
(9)

In one embodiment of the present invention, the compound of formula (1) has excellent reactivity with HF, thereby removing HF in the electrolyte composition. Accordingly, it can play a role of improving stability, particularly high temperature stability. Particularly, the compound of formula (1), wherein R is $Si[(CH_2)_xCH_3]_y[(CH_2)_zCF_3]_{3-y}$, and x, y and z are each independently an integer of 0 to 3 is preferred in terms of HF removing ability.

The compound of formula (1) may be commercially available, or may be prepared by methods known in the art.

In one embodiment of the present invention, the compound of formula (1) may be contained in an amount of 0.05 to 5% by weight, preferably 0.05 to 3% by weight, based on 100% by weight of the total electrolyte composition. When the compound of formula (1) is contained in an amount less than 0.05% by weight, the SEI film forming ability is degraded and it is hard to expect the effect of increasing stability at the high temperature, and when the compound of formula (1) is contained in an amount exceeding 5% by weight, the resistance increases, which may shorten lifespan of the battery.

In one embodiment of the present invention, the cyclic fluorocarbonate-based compound forms a stable SEI film on a surface of a negative electrode active material and serves as a co-solvent.

Examples of the cyclic fluorocarbonate-based compound may include fluoroethylene carbonate (FEC), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate or a combination thereof, and particularly, fluoroethylene carbonate (FEC) is preferred in terms of SEI film forming ability.

In one embodiment of the present invention, the cyclic fluorocarbonate-based compound may be contained in an amount of 0.5 to 30% by weight, preferably 0.5 to 20% by weight, based on 100% by weight of the total electrolyte composition. When the cyclic fluorocarbonate-based compound is contained in an amount less than 0.5% by weight, the SEI film forming ability may be degraded, and when the cyclic fluorocarbonate-based compound is contained in an amount exceeding 30% by weight, HF may be excessively generated in the electrolyte during operation.

In one embodiment of the present invention, the weight ratio of the compound of formula (1) and the cyclic fluorocarbonate-based compound may be 1:1 to 1:20, preferably 1:1 to 1:10, more preferably 1:1 to 1:5. When the weight ratio of the compound of formula (1) and the cyclic fluorocarbonate-based compound is within the above range, lifespan characteristic at room temperature, lifespan characteristic at high temperature, and stability at high temperature can be effectively improved at the same time.

In one embodiment of the present invention, the nonaqueous solvent plays a role of a medium which allows the migration of ions involved in electrochemical reactions of the battery.

As the nonaqueous solvent, any one conventionally used in the art can be used without particular limitation. Examples of the nonaqueous solvent may include carbonate-based solvents, ester-based solvents, ether-based solvents, ketone-based solvents, alcohol-based solvents, or other aprotic solvents and the like. These may be used alone or in a combination of two or more.

As the carbonate-based solvents, chain carbonate-based solvents, cyclic carbonate-based solvents, or a combination thereof can be used.

Examples of the chain carbonate-based solvents may include diethyl carbonate (DEC), dimethyl carbonate (DMC), dipropyl carbonate (DPC), methylpropyl carbonate (MPC), ethylpropyl carbonate (EPC), ethylmethyl carbonate (EMC) or a combination thereof, and examples of the cyclic carbonate-based solvents may include ethylene carbonate (EC), propylene carbonate (PC), butylene carbonate (BC), vinylethylene carbonate (VEC) or a combination thereof.

As the ester-based solvents, methyl acetate, ethyl acetate, n-propyl acetate, pentyl acetate, methyl propionate, ethyl propionate, butyl propionate, γ-butyrolactone, decanolide, valerolactone, mevalonolactone, caprolactone, methyl formate, ethyl formate, propyl formate and the like may be used.

As the ether-based solvents, dibutyl ether, tetraglyme, diglyme, 1,2-dimethoxyethane, 1,2-diethoxyethane, ethoxymethoxyethane, 2-methyltetrahydrofuran, tetrahydrofuran and the like may be used.

As the ketone-based solvents, cyclohexanone and the like may be used.

As the alcohol-based solvents, ethyl alcohol, isopropyl alcohol and the like may be used.

As the other aprotic solvents, dimethylsulfoxide, 1,2-dioxolane, sulfolane, methylsulfolane, 1,3-dimethyl-2-imidazolidinone, N-methyl-2-pyrrolidinone, formamide, dimethylformamide, acetonitrile, nitromethane, trimethyl phosphate, triethyl phosphate, trioctyl phosphate and the like may be used.

The electrolyte composition according to one embodiment of the present invention may further comprise a lithium salt.

The lithium salt works as a supply source of lithium ions in the battery, and plays a role of promoting the migration of lithium ions between the positive electrode and the negative electrode.

Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, LiCl, LiBr, LiI, $LiB(C_2O_4)_2$(lithium bis(oxalato) borate, LiBOB), $Li(CH_3CO_2)$, $Li(CF_3SO_3)$, $Li(FSO_2)_2N$, $Li(CF_3SO_2)_3C$ and the like. These may be used alone or in a combination of two or more.

The concentration of the lithium salt may be 0.1 to 2.0M. When the concentration of the lithium salt is within the above range, the electrolyte composition can have appropriate conductivity and viscosity.

One embodiment of the present invention relates to a secondary battery comprising the electrolyte composition described above.

Since the secondary battery according to the present invention comprises the electrolyte composition of the present invention comprising the cyclic fluorocarbonate-based compound together with the compound of formula (1), a stable SEI film can be formed on the surface of the negative electrode during the initial charging (formation step), and thus it has excellent lifespan characteristic. Further, HF generated during the operation of the battery can be removed, and thus it has excellent stability, particularly high temperature stability.

In one embodiment of the present invention, the secondary battery may be a lithium secondary battery, for example, a lithium ion secondary battery.

The lithium secondary battery comprises a positive electrode, a negative electrode and the above-described electrolyte composition.

The positive electrode comprises a positive electrode current collector and a positive electrode active material layer formed on the positive electrode current collector.

The positive electrode current collector may be used without particular limitation as long as it has conductivity without causing chemical changes in the battery. Specifically, as the positive electrode current collector, aluminum, copper, stainless steel, nickel, titanium, calcined carbon, copper or stainless steel which is surface-treated with carbon, nickel, titanium, silver, etc., an aluminum-cadmium alloy, and the like may be used, and particularly, aluminum may be used. The positive electrode current collector may have various shapes such as foil, net, and porous body, and may enhance the bonding strength of the positive electrode active material by forming fine irregularities on the surface.

The positive electrode current collector may have a thickness of 3 to 500 µm.

The positive electrode active material layer comprises a positive electrode active material, a binder, and optionally a conductive material.

As the positive electrode active material, a compound allowing reversible intercalation and deintercalation of lithium may be used. Specifically, as the positive electrode active material, at least one of a composite oxide or composite phosphate formed of lithium and a metal selected from cobalt, manganese, nickel, aluminum, iron, and a combination thereof may be used. More specifically, as the positive electrode active material, lithium cobalt oxide, lithium nickel oxide, lithium manganese oxide, lithium nickel cobalt manganese oxide, lithium nickel cobalt aluminum oxide, lithium iron phosphate, and the like may be used.

The binder serves to attach the positive electrode active material particles to each other, and attach the positive electrode active material to the positive electrode current collector. Specifically, as the binder, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like may be used.

The conductive material is used to impart conductivity to the electrode, and can be used without limitation as long as it does not cause chemical changes and has electronic conductivity. Specifically, as the conductive material, carbon-based materials such as natural graphite, artificial graphite, carbon black, acetylene black, Ketjen black, carbon fiber and the like; metallic materials such as copper, nickel, aluminum, silver and the like; conductive polymers such as polyphenylene derivatives, etc. can be used.

The negative electrode comprises a negative electrode current collector and a negative electrode active material layer formed on the negative electrode current collector.

The negative electrode current collector may be used without particular limitation as long as it has conductivity without causing chemical changes to the battery. Specifically, as the negative electrode current collector, copper, aluminum, stainless steel, nickel, titanium, calcined carbon, copper or stainless steel which is surface-treated with carbon, nickel, titanium, silver, etc., an aluminum-cadmium alloy, and the like may be used, and particularly, copper may be used. The negative electrode current collector may have various shapes such as foil, net, and porous body, and may enhance the bonding strength of the negative electrode active material by forming fine irregularities on the surface.

The negative electrode current collector may have a thickness of 3 to 500 µm.

The negative electrode active material layer comprises a negative electrode active material, a binder, and optionally a conductive material.

As the negative electrode active material, a material allowing reversible intercalation and deintercalation of lithium ions, lithium metal, an alloy of lithium metal, a material which can dope and dedope lithium, a transition metal oxide, etc. may be used.

The material allowing reversible intercalation and deintercalation of lithium ions may be a carbon-based material, which may include crystalline carbon, noncrystalline carbon, or a combination thereof. Examples of the crystalline carbon may include amorphous, plate-shaped, flake-shaped, spherical or fibrous graphite, which may be natural graphite or artificial graphite. Examples of the noncrystalline carbon may include soft carbon or hard carbon, mesophase pitch carbide, and calcined coke.

As the alloy of lithium metal, an alloy of lithium and a metal selected from the group consisting of Na, K, Rb, Cs, Fr, Be, Mg, Ca, Sr, Si, Sb, Pb, In, Zn, Ba, Ra, Ge, Al and Sn may be used.

As the material which can dope and dedope lithium, Si, Si—C composite, $SiO_x$ ($0<x<2$), Si-Q alloy (wherein Q is an element selected from the group consisting of alkali metal, alkali earth metal, group 13 element, group 14 element, group 15 element, group 16 element, transition metal, rare earth element, and a combination thereof, and is not Si), Sn, $SnO_2$, Sn—R alloy (wherein R is an element selected from the group consisting of alkali metal, alkali earth metal, group 13 element, group 14 element, group 15 element, group 16 element, transition metal, rare earth element, and a combination thereof, and is not Sn), etc. may be used, and at least one of them can be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po and a combination thereof.

The transition metal oxide may be vanadium oxide, lithium vanadium oxide, or lithium titanium oxide, etc.

The binder serves to attach the negative electrode active material particles to each other, and attach the negative electrode active material to the negative electrode current collector. Specifically, the binder may be the same as those used for the positive electrode active material layer.

The conductive material is used to impart conductivity to the electrode, and can be used without limitation as long as it does not cause chemical changes and has electronic conductivity. Specifically, the conductive material may be the same as those used for the positive electrode active material layer.

The positive electrode and negative electrode can be prepared by a method commonly known in the art.

Specifically, each of the positive electrode and negative electrode is prepared by mixing an active material, a binder, and optionally a conductive material in a solvent to prepare an active material composition, and then applying the active material composition on a current collector.

As the solvent, N-methylpyrrolidone (NMP), acetone, water, etc. may be used.

The positive electrode and negative electrode may be separated by a separator. The separator may be used without particular limitation, as long as it is commonly used in the art. Particularly, it is suitable to have low resistance to ion migration in the electrolyte composition and have excellent wetting ability of the electrolyte composition. The separator may be a material selected from glass fiber, polyester, teflon, polyethylene, polypropylene, polytetrafluoroethylene (PTFE), and a combination thereof, and may be in the form of a nonwoven or woven fabric. The separator may have a pore diameter of 0.01 to 10 μm and a thickness of 3 to 100 μm. The separator may be a single-layer or multi-layer film.

The lithium secondary battery may be manufactured by a method commonly known in the art.

Specifically, the lithium secondary battery can be manufactured by interposing a separator between the positive electrode and negative electrode to obtain a laminate, then winding or folding the laminate to accommodate it in a battery container, and injecting the electrolyte composition into the battery container, followed by sealing it with a sealing member.

The battery container may be a cylindrical type, a prismatic type, a thin film type, etc.

The secondary battery may be used for mobile phones, portable computers, electric vehicles and the like. In addition, the secondary battery may be used for hybrid vehicles, etc. in combination with an internal combustion engine, a fuel cell, a supercapacitor, etc., and may also be used in electric bicycles and power tools requiring high-power and high-voltage and operation at high temperature.

Hereinafter, the present invention will be described in more detail with reference to examples, comparative examples and experimental examples. It should be apparent to those skilled in the art that these examples, comparative examples and experimental examples are for illustrative purposes only, and the scope of the present invention is not limited thereto.

Synthesis Example 1: Synthesis of the Compound of Formula (4)

In acetonitrile as a reaction solvent, 1.4 g of the compound of formula (3) and 3.6 g of 1,3-bis(3,3,3-trifluoropropyl)-1,1,3,3-tetramethyldisilazane were reacted at a temperature of 25° C. for 1 hour, followed by purification using vacuum distillation to obtain 2.8 g of the compound of formula (4) (yield: 98%).

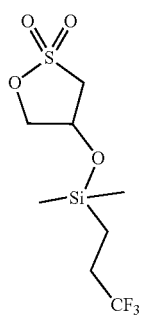

(4)

$^1$H NMR (299.87 MHz, CDCl$_3$): δ=0.16-0.28 (t, 6H), 0.82-0.87 (dt, 2H), 2.01-2.14 (m, 2H), 3.14-3.18 (dd, 1H), 3.50-3.55 (dd, 1H), 4.20-4.24 (dd, 1H), 4.51-4.55 (dd, 1H), 4.83-4.89 (qui, 1H) ppm Example 1: Preparation of Electrolyte Composition To a mixed solvent in which ethylene carbonate (EC) and ethylmethyl carbonate (EMC) were mixed in a volume ratio of 3:7 was added LiPF$_6$ to 1.0M, and then the compound of formula (2) was added in an amount of 1% by weight based on 100% by weight of the total electrolyte composition, followed by adding fluoroethylene carbonate in an amount of 3% by weight to prepare an electrolyte composition.

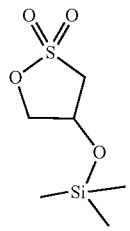

(2)

Example 2: Preparation of Electrolyte Composition

An electrolyte composition was prepared in the same manner as in Example 1, except that the compound of formula (3) was used instead of the compound of formula (2).

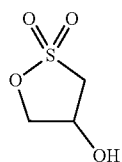

(3)

Example 3: Preparation of Electrolyte Composition

An electrolyte composition was prepared in the same manner as in Example 1, except that the compound of formula (2) was added in an amount of 0.05% by weight.

Example 4: Preparation of Electrolyte Composition

An electrolyte composition was prepared in the same manner as in Example 1, except that the compound of formula (2) was added in an amount of 3% by weight.

Example 5: Preparation of Electrolyte Composition

An electrolyte composition was prepared in the same manner as in Example 1, except that fluoroethylene carbonate was added in an amount of 0.5% by weight.

Example 6: Preparation of Electrolyte Composition

An electrolyte composition was prepared in the same manner as in Example 1, except that fluoroethylene carbonate was added in an amount of 20% by weight.

Example 7: Preparation of Electrolyte Composition

An electrolyte composition was prepared in the same manner as in Example 1, except that the compound of formula (4) was used instead of the compound of formula (2).

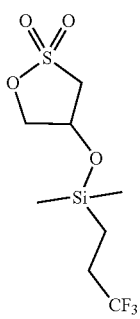

(4)

Example 8: Preparation of Electrolyte Composition

An electrolyte composition was prepared in the same manner as in Example 1, except that the compound of formula (5) was used instead of the compound of formula (2).

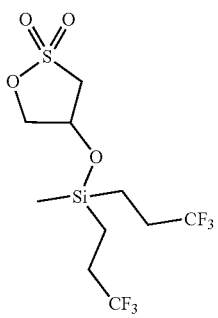

(5)

Example 9: Preparation of Electrolyte Composition

An electrolyte composition was prepared in the same manner as in Example 1, except that the compound of formula (6) was used instead of the compound of formula (2).

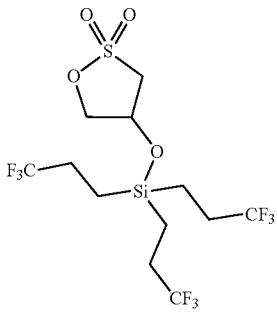

(6)

Example 10: Preparation of Electrolyte Composition

An electrolyte composition was prepared in the same manner as in Example 1, except that the compound of formula (7) was used instead of the compound of formula (2).

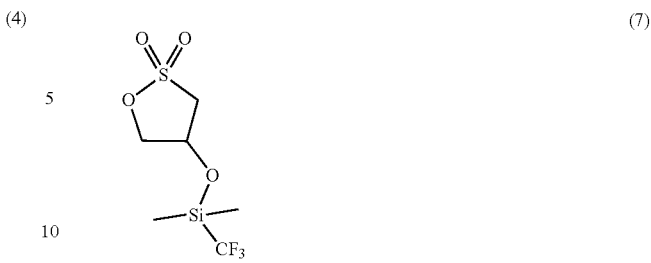

(7)

Example 11: Preparation of Electrolyte Composition

An electrolyte composition was prepared in the same manner as in Example 1, except that the compound of formula (8) was used instead of the compound of formula (2).

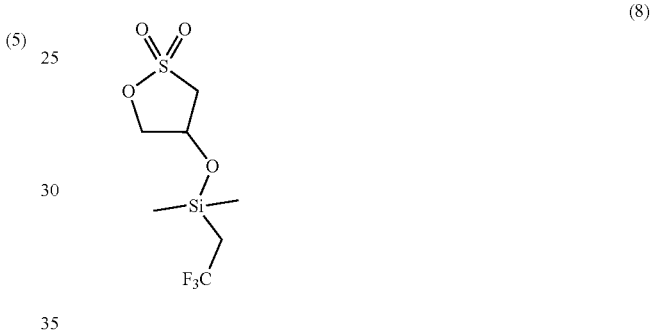

(8)

Example 12: Preparation of Electrolyte Composition

An electrolyte composition was prepared in the same manner as in Example 1, except that the compound of formula (9) was used instead of the compound of formula (2).

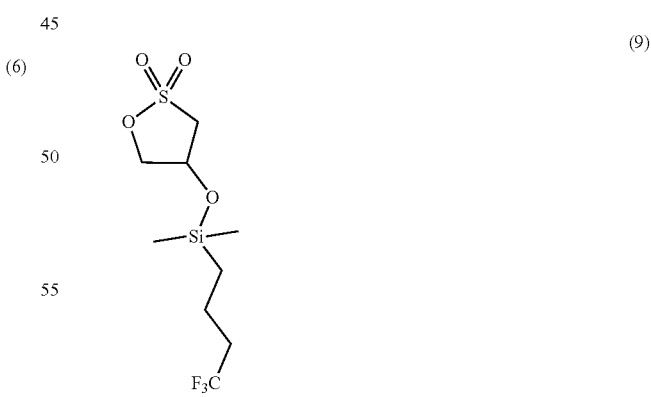

(9)

Comparative Example 1: Preparation of Electrolyte Composition

An electrolyte composition was prepared in the same manner as in Example 1, except that the compound of formula (2) was not added.

Comparative Example 2: Preparation of Electrolyte Composition

An electrolyte composition was prepared in the same manner as in Example 1, except that fluoroethylene carbonate was not added.

Comparative Example 3: Preparation of Electrolyte Composition

An electrolyte composition was prepared in the same manner as in Example 2, except that fluoroethylene carbonate was not added.

Comparative Example 4: Preparation of Electrolyte Composition

An electrolyte composition was prepared in the same manner as in Example 7, except that fluoroethylene carbonate was not added.

Comparative Example 5: Preparation of Electrolyte Composition

An electrolyte composition was prepared in the same manner as in Example 1, except that the compound of formula (a) was used instead of the compound of formula (2).

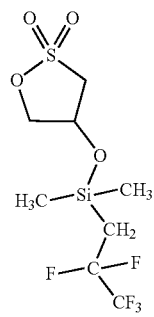

(a)

Experimental Example 1

Secondary batteries were prepared as below using the electrolyte compositions prepared in the above Examples and Comparative Examples. The lifespan characteristic at room temperature, stability at high temperature, and lifespan characteristic at high temperature were measured by the methods below, and the discoloration characteristic after storage of the electrolyte composition was observed. The results are shown in Table 1 below.

<Manufacture of Secondary Battery>

To a mixture of $LiNi_{1/3}Co_{1/3}Mn_{1/3}O_2$ powder as a positive electrode active material, a carbon conductive material (Super-P; Timcal Ltd.), and a PVDF (polyvinylidene fluoride) binder in a weight ratio of 90:5:5 was added N-methylpyrrolidone (NMP) as a solvent to a solid content of 60% by weight to prepare a positive electrode slurry. The positive electrode slurry was coated with a thickness of about 40 μm on an aluminum foil having a thickness of 15 μm. It was dried at room temperature, then dried again at 120° C., and then rolled to prepare a positive electrode.

To a mixture of artificial graphite as a negative electrode active material, styrene-butadiene rubber and carboxymethylcellulose in a weight ratio of 90:5:5 was added N-methylpyrrolidone to a solid content of 60% by weight to prepare a negative electrode slurry. The negative electrode slurry was coated with a thickness of about 40 μm on a copper foil having a thickness of 10 μm. It was dried at room temperature, then dried again at 120° C., and then rolled to prepare a negative electrode.

A secondary battery was prepared using the positive electrode, the negative electrode and the electrolyte composition with a polyethylene separator.

The prepared secondary battery was charged at 25° C. with a constant current of 0.2 C until the voltage reached 4.2V, and then discharged at a constant current of 0.2 C until the voltage reached 2.5V. Then, constant current charging was performed with a current of 0.5 C until the voltage reached 4.2V, and while maintaining 4.2V, constant voltage charging was performed until the current reached 0.05 C. Subsequently, discharging was performed at a constant current of 0.5 C until the voltage reached 2.5V at the time of discharging (formation step).

(1) Lifespan Characteristic at Room Temperature

The secondary battery that had undergone the formation step was charged at 25° C. at a constant current of 1.0 C until the voltage reached 4.2V, and while maintaining 4.2V, the secondary battery was charged with a constant voltage until the current reached 0.05 C. Subsequently, discharging was performed at a constant current of 1.0 C until the voltage reached 2.5V at the time of discharging. The cycle was repeated 300 times.

The capacity retention ratio (%) at the 300th cycle of each secondary battery was calculated by the following Equation 1.

Capacity retention rate [%]=[Discharge capacity at the 300th cycle/Discharge capacity at the first cycle]×100  [Equation 1]

(2) Voltage Preservation Stability at High Temperature

The secondary battery that had undergone the formation step was charged at 25° C. at a constant current of 1.0 C until the voltage reached 4.2V, and while maintaining 4.2V, the secondary battery was charged with a constant voltage until the current reached 0.05 C. Subsequently, while storing the charged secondary battery at 60° C., the voltage was measured every 24 hours using a multi-meter to measure the residual voltage of the charged-state cell at the high temperature to determine voltage preservation stability at high temperature.

The voltage retention rate (%) at the time of the measurement on the 15th day of each secondary battery was calculated by the following Equation 2.

Voltage retention rate [%]=[Open circuit voltage on the 15th day/Initial open circuit voltage]×100  [Equation 2]

(3) Discoloration Characteristic

The electrolyte compositions prepared in Examples and Comparative Examples were stored at 60° C. for 15 days, and then the change of the color was observed and evaluated according to the following evaluation criteria.

<Evaluation Criteria>
◯: No color change
x: Color change (4) Lifespan Characteristic at High Temperature The secondary battery that had undergone the formation step was charged at 45° C. at a constant current of 1.0 C until the voltage reached 4.2V, and while maintaining 4.2V, the secondary battery was charged with a constant voltage until the current reached 0.05 C. Subsequently, discharging was performed at a constant current of 1.0 C until the voltage reached 2.5V at the time of discharging. The cycle was repeated 300 times.

The capacity retention ratio (%) at the 300th cycle of each secondary battery was calculated by the above Equation 1.

TABLE 1

|  | Lifespan characteristic at room temperature | Stability at high temperature | Discoloration characteristic | Lifespan characteristic at high temperature |
|---|---|---|---|---|
| Example 1 | 94.0% | 96.2% | ○ | 92.3% |
| Example 2 | 91.4% | 95.5% | ○ | 89.3% |
| Example 3 | 87.1% | 96.0% | ○ | 86.7% |
| Example 4 | 93.8% | 96.2% | ○ | 90.4% |
| Example 5 | 87.8% | 95.2% | ○ | 89.5% |
| Example 6 | 96.7% | 95.7% | ○ | 88.2% |
| Example 7 | 94.2% | 96.3% | ○ | 92.5% |
| Example 8 | 93.8% | 96.1% | ○ | 90.8% |
| Example 9 | 93.3% | 95.9% | ○ | 91.2% |
| Example 10 | 94.0% | 96.2% | ○ | 91.1% |
| Example 11 | 93.9% | 96.1% | ○ | 90.5% |
| Example 12 | 93.6% | 96.3% | ○ | 90.8% |
| Comparative Example 1 | 86.3% | 94.3% | ○ | 79.3% |
| Comparative Example 2 | 81.7% | 96.0% | ○ | 75.4% |
| Comparative Example 3 | 76.3% | 95.5% | ○ | 70.3% |
| Comparative Example 4 | 82.1% | 96.0% | ○ | 78.4% |
| Comparative Example 5 | 84.1% | 93.8% | x | 79.3% |

As shown in Table 1, the secondary batteries prepared using the electrolyte compositions of Examples 1 to 12 comprising a propane sultone compound of formula (1) and a cyclic fluorocarbonate-based compound according to the present invention showed superior lifespan characteristic at room temperature as well as excellent stability and lifespan characteristic even at high temperature, as compared with the secondary batteries prepared using the electrolyte compositions of Comparative Examples 1 to 5.

It seems to be because, in the electrolyte composition according to the present invention, the cyclic fluorocarbonate-based compound forms SEI film, and the propane sultone compound of formula (1) removes HF which is generated by the cyclic fluorocarbonate-based compound and is ring-opened by electrochemical reaction, thereby contributing to the formation of SEI film.

The electrolyte composition of Comparative Example 5 showed discoloration after the storage for a certain period.

As particular embodiments of the present invention have been described in detail above, it will be obvious to those skilled in the art that these specific techniques are merely preferred embodiments and the scope of the invention is not limited thereto. It will be understood by those skilled in the art that various changes and modifications may be made based on the above contents without departing from the spirit and scope of the present invention.

The substantial scope of the present invention, therefore, is to be defined by the appended claims and equivalents thereof.

The invention claimed is:

1. An electrolyte composition comprising a compound of the formula (1) below, a cyclic fluorocarbonate-based compound, and a nonaqueous solvent, wherein the cyclic fluorocarbonate-based compound is contained in an amount of 0.5 to 30% by weight, based on 100% by weight of the total electrolyte composition,

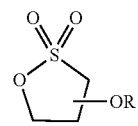

(1)

wherein,

R is $Si[(CH_2)_xCH_3]_y[(CH_2)_2CF_3]_{3-y}$, and x, y and z are each independently an integer of 0 to 3.

2. The electrolyte composition of claim 1, wherein the compound of formula (1) is a compound represented by any one of formulae (2) and (4) to (9):

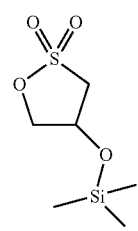

(2)

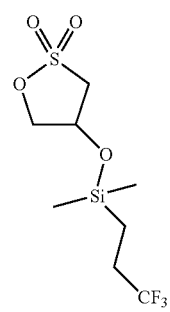

(4)

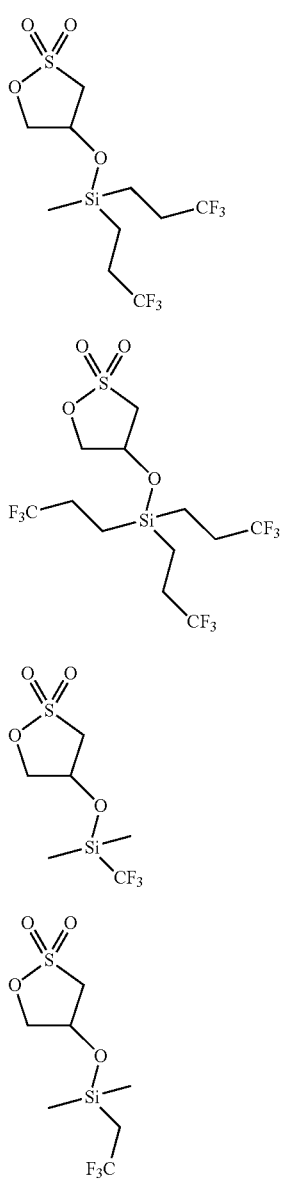

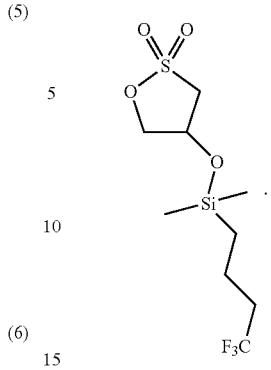

3. The electrolyte composition of claim 1, wherein the compound of formula (1) is contained in an amount of 0.05 to 5% by weight, based on 100% by weight of the total electrolyte composition.

4. The electrolyte composition of claim 1, wherein the cyclic fluorocarbonate-based compound comprises fluoroethylene carbonate.

5. The electrolyte composition of claim 1, wherein a weight ratio of the compound of formula (1) and the cyclic fluorocarbonate-based compound is 1:1 to 1:20.

6. The electrolyte composition of claim 1, further comprising a lithium salt.

7. A secondary battery comprising the electrolyte composition of claim 1.

8. The secondary battery of claim 7, wherein the secondary battery is a lithium secondary battery.

9. A secondary battery comprising the electrolyte composition of claim 2.

10. A secondary battery comprising the electrolyte composition of claim 3.

11. A secondary battery comprising the electrolyte composition of claim 4.

12. A secondary battery comprising the electrolyte composition of claim 5.

13. A secondary battery comprising the electrolyte composition of claim 6.

* * * * *